United States Patent
Kim et al.

(10) Patent No.: US 9,458,360 B2
(45) Date of Patent: Oct. 4, 2016

(54) WATER-BASED ADHESIVE COMPOSITION, METHOD FOR MANUFACTURING SAME, AND ADHESIVE FILM

(75) Inventors: Jang Soon Kim, Seongnam-si (KR); Ik Hwan Cho, Daejeon (KR); Dong Hoon Lim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 129 days.

(21) Appl. No.: 13/384,988

(22) PCT Filed: Jul. 30, 2010

(86) PCT No.: PCT/KR2010/005057
§ 371 (c)(1),
(2), (4) Date: Jan. 19, 2012

(87) PCT Pub. No.: WO2011/025153
PCT Pub. Date: Mar. 3, 2011

(65) Prior Publication Data
US 2012/0121897 A1    May 17, 2012

(30) Foreign Application Priority Data

Aug. 25, 2009 (KR) ........................ 10-2009-0078979

(51) Int. Cl.
*C09J 7/02* (2006.01)
*C09J 133/06* (2006.01)
*C09J 133/14* (2006.01)
*C08K 5/053* (2006.01)

(52) U.S. Cl.
CPC .............. *C09J 133/06* (2013.01); *C08K 5/053* (2013.01); *C08L 2201/52* (2013.01); *C09J 7/0278* (2013.01); *C09J 133/066* (2013.01); *C09J 133/068* (2013.01); *C09J 133/14* (2013.01); *C09J 2203/334* (2013.01); *Y10T 428/265* (2015.01); *Y10T 428/28* (2015.01); *Y10T 428/2839* (2015.01)

(58) Field of Classification Search
None
See application file for complete search history.

(56) References Cited

U.S. PATENT DOCUMENTS

| 5,716,701 A * | 2/1998 | Skoglund et al. ..... 428/355 AC |
| 5,814,685 A * | 9/1998 | Satake et al. ................. 523/201 |
| 6,180,244 B1 | 1/2001 | Rayner et al. |
| 6,558,790 B1 * | 5/2003 | Holguin et al. .......... 428/355 R |
| 7,070,051 B2 * | 7/2006 | Kanner et al. ................. 206/382 |
| 2004/0213992 A1 * | 10/2004 | Shirai et al. .................. 428/343 |
| 2005/0143498 A1 * | 6/2005 | Musch et al. ................... 524/47 |
| 2006/0211821 A1 | 9/2006 | Ueda et al. |
| 2007/0155879 A1 | 7/2007 | Osae et al. |
| 2009/0186221 A1 * | 7/2009 | Yatagai et al. ......... 428/355 AC |

FOREIGN PATENT DOCUMENTS

| CN | 1517422 A | 8/2004 |
| CN | 1557002 A | 12/2004 |
| EP | 1621568 A1 | 1/2006 |
| JP | 2008081677 A | 4/2008 |
| JP | 2008081678 A | 4/2008 |
| JP | 2008274255 A | 11/2008 |
| JP | 2009521582 A | 6/2009 |
| JP | 2009099825 A | 7/2009 |
| KR | 10-2008-0029837 A | 4/2008 |
| KR | 2009087704 A * | 8/2009 |
| WO | 2009-031421 A1 | 3/2009 |
| WO | 2009-119220 A1 | 10/2009 |

OTHER PUBLICATIONS

Aldrich Data Sheet (2013).*
Machine translation of JP 2009099825A (2009).*
Human translation of KR 2009087704 A (2009).*
Human translation of JP 2009099825 A (2009).*

* cited by examiner

*Primary Examiner* — Frank D Ducheneaux
(74) *Attorney, Agent, or Firm* — Nath, Goldberg & Meyer; Jerald L. Meyer; Christopher Thomas

(57) ABSTRACT

The present invention relates to a water-based adhesive composition, to a method for manufacturing same, and to an adhesive film. The water-based adhesive composition according to the present invention has excellent physical properties such as detachability and reworkability, and can stably prevent changes in the physical properties thereof caused by longitudinal or environmental factors. In addition, the water-based adhesive composition according to the present invention has excellent wettability with respect to various adherends. Accordingly, the water-based adhesive composition according to the present invention can be effectively applied to various industrial adhesive products such as adhesive films for advertisements.

7 Claims, No Drawings

WATER-BASED ADHESIVE COMPOSITION, METHOD FOR MANUFACTURING SAME, AND ADHESIVE FILM

TECHNICAL FIELD

The present invention relates to a water-based adhesive composition, a method for manufacturing the same, and an adhesive film.

BACKGROUND ART

Adhesive films are widely used for signboards or various printed media. For example, adhesive films are employed to attach company name boards or logos of convenience stores, fast food restaurants or banks, or are frequently used to attach logos or slogans of companies to buses or taxis for advertisement.

In particular, adhesive films for advertisements are generally formed of a polyvinyl chloride (PVC) film to print out actual images on a base and an adhesive layer formed on the PVC film. Further, currently used adhesives are mostly formed using organic solvents. However, with increasingly stringent domestic and international environmental regulations and growing demands for clean working environments, a need for waterborne adhesives favorable for cost reduction and productivity growth increases.

If water-based adhesives are used instead of organic solvent-based adhesives widely used in the related art, water is continuously used as a medium and cost reduction is thus realized while facilitating mixing and treatment, thereby providing improved workability and clean working environments without follow-up processes.

For effective application to advertising products, a water-based adhesive composition may be properly attached to various adherends, e.g., metal plates, glass, coated surfaces, plastic surfaces, and concrete surfaces depending on applications. Further, water-based adhesives applied to such adherends have appropriate peeling strength and secures excellent re-peeling properties such that adhesives do not remain after peeling.

Further, since advertising products are frequently exposed to outdoor environments for a long period of time, it is necessary for a water-based adhesive composition to have temporal stability over time against environmental factors.

DISCLOSURE

Technical Problem

The present invention provides water-based adhesive compositions and adhesive films.

Technical Solution

In accordance with one aspect of the present invention, a water-based adhesive composition includes: a waterborne adhesive resin and having a concentration of ionic components of less than 600 ppm.

In accordance with another aspect of the present invention, a method for manufacturing a water-based adhesive composition includes: preparing an adhesive composition including a waterborne adhesive resin and adjusting a concentration of ionic components included in the adhesive composition to be less than 600 ppm.

In accordance with a further aspect of the present invention, an adhesive film includes a base film, and an adhesive layer formed on one or opposite sides of the base film and comprising a cured material of the adhesive composition.

Advantageous Effects

According to embodiments of the present invention, a water-based adhesive composition exhibits excellent physical properties in terms of peeling properties and reworkability, and may allow stable control of change in such physical properties, such as peeling properties, caused by temporal or environmental factors. In addition, the water-based adhesive composition has excellent wettability with respect to various adherends. Accordingly, the water-based adhesive composition may be effectively applied to various industrial adhesive products including adhesive films for advertisement.

Best Mode

The present invention relates to a water-based adhesive composition including a waterborne adhesive resin and having a concentration of ionic components of less than 600 ppm.

Next, the water-based adhesive composition according to the present invention will be described in detail.

The concentration of ionic components included in the water-based adhesive composition according to the present invention is limited to less than 600 ppm. Herein, the term "ionic component" refers to various inorganic metal ions (e.g., calcium or magnesium ions) which are included in water serving as a medium for the water-based adhesive composition, or to ionic impurities which are introduced by various additives (e.g., initiators or emulsifiers) used in preparing a waterborne adhesive resin and affect physical properties of adhesives such as stability. The water-based adhesive composition may have a concentration of ionic components of 400 ppm or less, preferably 200 ppm or less, and more preferably 100 ppm or less. If the concentration of ionic components is 600 ppm or higher, ionic components reactive with a functional group of the waterborne adhesive resin included in the composition excessively increase, thereby deteriorating physical properties of adhesives, such as peeling strength, temporal stability, aging rate, etc.

In this invention, the concentration of ionic components of the adhesive composition may be measured by any quantitative analysis method known in the art, without being specifically limited. For example, the concentration of ionic components may be analyzed by Inductively Coupled Plasma (ICP) mass spectroscopy.

Further, the water-based adhesive composition may have an aging rate of 20% or less, preferably 10% or less, measured by Equation 1:

$$\text{Aging rate (\%)} = (b-c)/b \times 100,$$

where b is initial peel strength of an adhesive prepared from the water-based adhesive composition, and c is peel strength of the adhesive measured after being left at 70° C. for 72 hours.

The peel strength of the adhesive may be measured, for example, according to JIS Z 0237, without being specifically limited. When the aging rate of the water-based adhesive composition is greater than 20%, temporal stability of peel strength is reduced, thereby deteriorating physical properties, such as reworkability.

The waterborne adhesive resin included in the adhesive composition may include any adhesive resin which is dispersible in a water-based medium (e.g., water). Particularly, the waterborne adhesive resin may include an adhesive resin having a glass transition temperature of −60 to −10° C. If the glass transition temperature of the adhesive resin is less than −60° C., adhesive strength is high, so that contaminants such as residues can remain when an adhesive is detached. If the glass transition temperature of the adhesive resin is greater than −10° C., wettability with respect to adherends such as glass or a coated surface decreases and detachment possibility increases, thereby deteriorating usability.

The waterborne adhesive resin may have a weight average molecular weight of 50,000 to 700,000. If the weight average molecular weight of the waterborne adhesive resin is less than 50,000, cohesion can be reduced, thereby decreasing durability. If the weight average molecular weight of the waterborne adhesive resin is greater than 700,000, adhesive properties can be reduced or latex particles may increase in size or viscosity, thereby deteriorating coatability.

The waterborne adhesive resin may have any composition so long as the resin has the physical properties as described above. For example, the adhesive resin may include a polymer of a monomer mixture including 90 to 99.9 parts by weight of a (meth)acrylic acid ester monomer and 0.1 to 10 parts by weight of a crosslinking monomer.

The (meth)acrylic acid ester monomer may include, without being limited to, for example, alkyl(meth)acrylates. Here, if an alkyl group included in the monomer has an excessively long chain, cohesion of the adhesive is reduced and it may be difficult to adjust glass transition temperature (Tg) and tack. Thus, alkyl(meth)acrylates having C1 to C12 alkyl groups may be used. In this case, if alkyl(meth)acrylates having C10 or more alkyl groups are used, an adhesive has appropriate initial adhesive strength but cohesion of the adhesive can be slightly lowered. Thus, (meth)acrylates having C2 to C8 alkyl groups may be advantageously used, without being limited thereto. Examples of the monomer may include methyl(meth)acrylate, ethyl(meth)acrylate, n-propyl(meth)acrylate, isopropyl(meth)acrylate, n-butyl(meth)acrylate, t-butyl(meth)acrylate, sec-butyl (meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl (meth)acrylate, isobornyl(meth)acrylate, and tetradecyl (meth)acrylate, which may be used alone or in combination of two or more thereof. The (meth)acrylic acid ester monomer of the monomer mixture may be present in an amount of 90 to 99.9 parts by weight with respect to the crosslinking monomer. If the amount of (meth)acrylic acid ester monomer is less than 90 parts by weight, adhesives can have reduced initial adhesive strength. If the amount is greater than 99.9 parts by weight, physical properties such as heat resistance can be decreased.

The crosslinking monomer included in the monomer mixture increases cohesion of adhesives and provides a crosslinking point for curing. Examples of the crosslinking monomer may include a hydroxyl group containing monomer, a carboxyl group containing monomer, a nitrogen containing monomer, and a glycidyl group containing monomer, which may be used alone or in combination of two or more thereof. Particularly, a carboxyl group containing monomer may be used, without being limited thereto.

Examples of the hydroxyl group containing monomer may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxy ethylene glycol(meth)acrylate, and 2-hydroxy propylene glycol(meth)acrylate. Examples of the carboxyl group containing monomer may include (meth)acrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, maleic anhydride, and crotonic acid. Examples of the nitrogen containing monomer may include 2-isocyanatoethyl(meth)acrylate, 3-isocyanatopropyl(meth)acrylate, 4-isocyanatobutyl(meth)acrylate, (meth)acryl amide, N-vinylpyrrolidone, and N-vinylcaprolactam. For example, the glycidyl group containing monomer may be glycidyl(meth)acrylate, but is not limited thereto. In the present invention, these examples of the crosslinking monomer may be used alone or in combination of two or more thereof. The crosslinking functional group containing monomer may be present in an amount of 0.1 to 10 parts by weight with respect to the (meth)acrylic acid ester monomer. If the amount of crosslinking monomer is less than 0.1 parts by weight, cohesion of adhesives can be reduced, or adhesive strength or heat resistance thereof can decrease. If the amount of crosslinking monomer is greater than 10 parts by weight, adhesive strength or water resistance can decrease or aging problems of an adhesive according to temperature can occur.

The waterborne adhesive resin may have a particle diameter of 100 to 500 nm. If the particle diameter is less than 100 nm, particle stability can be deteriorated. If the particle diameter is more than 500 nm, cohesion of particles after drying decreases, thereby deteriorating adhesive properties.

The waterborne adhesive resin including the components described above may be prepared by any method. For example, general polymerization methods, such as solution polymerization, photopolymerization, bulk polymerization, suspension polymerization, or emulsion polymerization, may be used. Particularly, in preparation of the waterborne adhesive resin, suspension polymerization or emulsion polymerization may be preferable, and emulsion polymerization may be more preferable, without being limited thereto.

The water-based adhesive composition may further include 0.1 to 10 parts by weight of a multifunctional crosslinker based on 100 parts by weight of the waterborne adhesive resin. The multifunction crosslinker may adjust adhesive properties of an adhesive depending on an amount thereof and may react with a crosslinking functional group included in an adhesive as necessary to improve cohesion of the adhesive.

The crosslinker may include, without being limited to, general crosslinkers, such as isocyanate compounds, epoxy compounds, aziridine compounds, and metal chelate compounds. Examples of the isocyanate compound may include at least one selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate, and adducts of these isocyanate compounds and a polyol (e.g., trimethylolpropane). Examples of the epoxy compound may include at least one selected from the group consisting of ethylene glycol diglycidyl ether, triglycidyl ether, trimethylolpropane triglycidyl ether, N,N,N',N'-tetraglycidyl ethylene diamine, and glycerin diglycidyl ether. Examples of the aziridine compound may include at least one selected from the group consisting of N,N'-toluene-2,4-bis(1-aziridinecarboxamide), N,N'-diphenylmethane-4,4'-bis(1-aziridinecarboxamide), triethylenemelamine, bisisophthaloyl-1-(2-methylaziridine), and tri-1-aziridinylphosphine oxide. Examples of the metal chelate compound may include compounds obtained by coordinating acetylacetone or ethyl acetoacetate with a polyvalent metal, such as aluminum, iron, zinc, tin, titanium, antimony, magnesium, and/or vanadium, without being limited thereto.

The multifunctional crosslinker may be present in an amount of 0.1 to 10 parts by weight based on 100 parts by weight of the adhesive resin. If the amount of multifunctional crosslinker is less than 0.1 parts by weight, cohesion of an adhesive decreases, thereby causing cohesion destruction in high-temperature or high-humidity conditions. If the amount of multifunctional crosslinker is greater than 10 parts by weight, peeling or detachment between layers can occur, thereby reducing durability, or compatibility or fluidity can decrease.

The water-based adhesive composition may further include a wetting agent in addition to the above described components. Use of the wetting agent may resolve decrease in coatability, resulting from quick contraction of a water-based adhesive due to high surface tension thereof.

Any wetting agent may be used in the present invention, but a wetting agent represented by Formula 1 is preferably used.

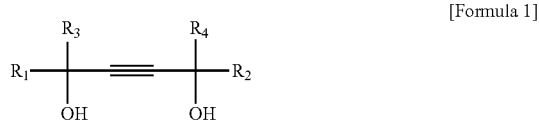

[Formula 1]

In Formula 1, R1 to R4 each independently represent hydrogen, or a straight chain or branched chain alkyl group.

In Formula 1, an alkyl group may be a C1 to C12 alkyl group, preferably a C1 to C8 alkyl group, and more preferably a C1 to C4 alkyl group. For example, the alkyl group is methyl or isopropyl.

In the present invention, an alkylene oxide, such as ethylene oxide or propylene oxide, may be added to a hydroxyl group in the compound of Formula 1.

The wetting agent represented by Formula 1 has low dynamic surface tension to effectively reduce the surface tension of the composition when coating is quickly conducted. Further, the wetting agent does not stabilize bubbles, and thus less of an antifoaming agent may be used. Moreover, the wetting agent has a structure in which a hydrophilic group is covered with a hydrophobic group, making it difficult to attract water when remaining on a dried layer, thereby preventing deterioration of water resistance.

The wetting agent may be present in an amount of 0.1 to 5 parts by weight based on 100 parts by weight of the adhesive resin in the water-based adhesive composition. If the amount of wetting agent is less than 0.1 parts by weight, effects of the added wetting agent are not insignificant. If the amount of wetting agent is greater than 5 parts by weight, physical properties of the water-based adhesive composition can be deteriorated.

The water-based adhesive composition may further include at least one kind of additives selected from the group consisting of tackifiers, initiators, low-molecular weight materials, epoxy resins, UV stabilizers, antioxidants, coloring agents, reinforcing agents, antifoaming agents, plasticizers, foaming agents, organic salts, thickening agents, and flame retardants.

The present invention also relates to a method for manufacturing a water-based adhesive composition including preparing an adhesive composition (e.g., coating solution) including a waterborne adhesive resin; and adjusting the concentration of ionic components included in the adhesive composition to be less than 600 ppm.

The preparation of the adhesive composition and the adjustment of the concentration of ionic components may be sequentially conducted (e.g., preparing the adhesive composition, and then adjusting the concentration of ionic components). If necessary, while preparing the adhesive composition or the waterborne adhesive resin included in the composition, the concentration of ionic components in the final composition may be controlled. That is, preparing the adhesive composition and adjusting the concentration of ionic components may be conducted at the same time.

In preparation of the adhesive composition, the waterborne adhesive resin is prepared, and the adhesive composition (coating solution) is prepared using the waterborne adhesive resin, in which a process of controlling the concentration of ionic components may be concurrently carried out.

In this process, the adhesive resin may be prepared by, for example, suspension polymerization or emulsion polymerization. Preferably, emulsion polymerization is used. In emulsion polymerization, monomers to be polymerized may include the above illustrated (meth)acrylic acid ester monomers and crosslinking monomers.

Emulsion polymerization may be conducted in the presence of a pH buffer, an initiator, an oxidation-reduction catalyst, a molecular weight regulator, an emulsifier and/or ionized water, etc., which are described in detail as follows.

Examples of the pH buffer used in emulsion polymerization of the preparation process may include, without being limited to, at least one selected from the group consisting of sodium bicarbonate, sodium acetate, and potassium bicarbonate. The pH buffer may be present in an amount of 0.01 to 1 wt % in the total components in a reactor involved in emulsion polymerization. If the amount of pH buffer is less than 0.01 wt %, it is difficult to adjust molecular weight. If the amount of pH buffer is greater than 1 wt %, decrease in degree of polymerization and/or formation of agglomerated particles can occur.

Examples of the initiator used in the preparation process may include, without being limited to, at least one selected from the group consisting of potassium persulfate, sodium persulfate, and ammonium persulfate. The initiator may be present in an amount of 0.05 to 5 wt % in the total components in the reactor. If the amount of initiator is less than 0.05 wt %, the degree of polymerization can decrease. If the amount of initiator is greater than 5 wt %, molecular weight can decrease.

An oxidation-reduction catalyst may be used in the preparation process. Examples of the oxidation-reduction catalyst may include at least one selected from the group consisting of t-butyl hydroperoxide, benzoyl peroxide, cumen hydroperoxide, Rongalite (sodium formaldehyde sulfoxylate dehydrate), sodium metabisulfite, sodium persulfate, ammonium persulfate, sodium thiosulfate, hydrogen peroxide, and L-ascorbic acid. These catalysts may be used alone or preferably as mixtures for proper oxidation-reduction combination. The catalyst may be present in an amount of 0.01 to 1 wt % in the total components in the reactor. If the amount of catalyst is less than 0.01 wt %, it can be difficult to adjust reaction time and to eliminate un-reacted materials. If the amount of catalyst is greater than 1 wt %, a polymer can be contaminated.

Examples of the molecular weight regulator used in the present invention may include at least one selected from the group consisting of thioglycolic acid esters, n-dodecyl mercaptan, and low alcohols (e.g., methanol, ethanol, and butanol). The molecular weight regulator may be present in an amount of 0.005 to 1 wt % relative to the total components in the reactor. If the amount of molecular weight regulator is less than 0.005 wt %, it can be difficult to adjust molecular weight. If the amount of molecular weight regulator is greater than 1 wt %, heat resistance can be deteriorated.

According to the present invention, an emulsifier may be used. Examples of the emulsifier may include at least one selected from the group consisting of polyoxyethylene alkyl ethers, sorbitane fatty acid esters, polyethylene glycol fatty acid esters, carboxylates, and sulfonates. Preferably, these emulsifiers may be used as mixtures. Particularly, a nonionic emulsifier may be used in view of controlling the concentration of ionic components in the final composition. The emulsifier may be present in an amount of 1 to 5 wt % in the total components in the reactor. If the amount of emulsifier is less than 1 wt %, waterborne properties can be deteriorated. If the amount of emulsifier is greater than 5 wt %, water resistance can decrease.

Deionized water used in this emulsion polymerization may be present in an amount of 30 to 50 wt % relative to the total components in the reactor. If the amount of deionized water is less than 30 wt %, a reaction process can be deteriorated and precipitates can be formed due to viscosity. If the amount of deionized water is greater than 50 wt %, there can be difficulty in drying in follow-up processing.

However, the additives described above are provided only as illustrative examples for emulsion polymerization of the present invention, and any additive generally used in emulsion polymerization may be used for a desired adhesive resin according to the present invention.

In the present invention, polymerization is conducted using a properly selected mixture of the above components, and polymerization conditions are not specifically limited. Emulsion polymerization may be performed under one example of conditions as follows. First, deionized water and a pH buffer are placed in a reactor, and the reactor is heated to about 65 to 75° C. and maintained for 20 to 30 minutes. Subsequently, an initiator and an emulsifier solution are added to the reactor and heated to about 75 to 85° C., followed by addition of part of a mixture obtained by pre-emulsifying a monomer to be polymerized and deionized water with the emulsifier solution, thereby forming a seed. After about 5 to 30 minutes, the remaining pre-emulsified mixture and an initiator solution are slowly dripped thereto over about 20 to 300 minutes. Then, the mixture is left for about 1 hour and cooled to about 50 to 60° C., followed by oxidation and reduction for about 30 to 200 minutes and cooling, thereby preparing a waterborne adhesive resin according to the present invention.

In the present invention, the adhesive resin thus prepared is then properly mixed with a crosslinker or a wetting agent, illustrated above, thereby preparing an adhesive composition (coating solution).

In the present invention, controlling the concentration of ionic components in the adhesive composition is conducted concurrently with or subsequently to preparing the adhesive composition. Here, the concentration of ionic components in the adhesive composition may be controlled by any method, without being specifically limited. For example, while or after preparing the adhesive resin or the adhesive composition, a nonionic emulsifier, a thickening agent, additives having a low ion dissociation point and/or additives to form a complex with an ionic component may be properly used or added, or the adhesive composition may be dried at the highest possible temperature for a long period of time to volatilize ionic components, thereby controlling the concentration of ionic components in the adhesive composition.

Kinds of emulsifier, thickening agent or additives used in this process and drying conditions of the adhesive composition are not specifically limited but may be properly selected by those skilled in the art in consideration of desired contents of ionic components and desired physical properties of adhesives.

The present invention also relates to an adhesive film including a base film and an adhesive layer formed on one or opposite sides of the base film and comprising a cured material of the water-based adhesive composition.

As described above, the water-based adhesive composition according to the present invention exhibits excellent stability of peel strength against temporal or environmental factors and superior workability including re-peeling properties and thus is particularly useful for adhesive films for advertisement. In addition, the adhesive film according to the present invention may be effectively used not only for advertisements sheets but also for various industrial sheets, such as protective films, cleaning sheets, reflective sheets, adhesive sheets for structures, photos, and lane marking, optical adhesive products, and adhesive products for electronic components. Further, the adhesive film may also be effectively used for multi-layered laminate products, e.g., commercial adhesive products, medical patches, or heat activated pressure-sensitive adhesives.

The base film used for the adhesive film of the present invention is not specifically limited but may include any film generally used in the art. Examples of the base film may include, without being limited to, polyethylene films, polypropylene films, ethylene vinyl acetate copolymer films, polyvinyl chloride (PVC) films, polyvinylidene chloride films, polystyrene films, polycarbonate films, polyamide films, poly(ethylene terephthalate) films, polyvinylalcohol films, polyurethane films, polytetrafluoroethylene films, and acrylic films, which may be used alone, in combination of two or more thereof, or as laminates thereof. When the adhesive film is used for advertisement, a soft white PVC film having printability may be used as a base film, without being limited thereto.

In the present invention, the surface of the film may be subjected to releasing treatment. Here, examples of a releasing agent used for releasing treatment may include alkyd, silicon, fluorine, unsaturated ester, polyolefin, or wax releasing agents. Particularly, alkyd, silicon, and fluorine releasing agents may be used in view of heat resistance, without being limited thereto.

The thickness of the base film is not specifically limited but may be adjusted properly depending on applications. For example, the base film may have a thickness of 10 to 400 μm, preferably 10 to 150 μm.

Further, a method of forming an adhesive layer on the base film is not specifically limited. For example, the water-based adhesive composition or a coating solution prepared using the same is applied to the base film and dried to form an adhesive layer, or an adhesive layer formed on a proper release film is transferred to the base film.

The thickness of the adhesive layer is not specifically limited but may be adjusted properly depending on uses of the adhesive film. For example, the adhesive layer may have a thickness of 0.5 to 50 μm, preferably 5 to 40 μm. The thickness of the adhesive layer is adjusted within the above range, thereby obtaining an adhesive layer with a uniform thickness and preventing non-uniformity of physical properties of the adhesive sheet.

The adhesive film according to the present invention may further include a release film formed on the adhesive layer to prevent infiltration of impurities. The release film may include any material generally used in the art, for example, paper release-treated with a silicon compound. The thickness of the release film is not specifically limited and may be adjusted within the range of 10 to 200 μm.

EXAMPLES

Next, the present invention will be explained in more detail with reference to the following examples and comparative examples. It should be understood that these examples are provided for illustration only and are not construed as limiting the present invention.

Example 1

A wetting agent (e.g., 1,4-diisobutyl-1,4-dimethylbutynediol) as additives was properly added to a waterborne adhesive resin (WP300L, Kunyang Chemical) and uniformly mixed to prepare a water-based adhesive composition (coating solution) having a concentration of ionic components of 70 ppm. Here, the concentration of ionic components of the composition was analyzed by Inductively Coupled Plasma (ICP) mass spectroscopy. Subsequently, the coating solution was directly applied to a releasing paper sheet having a thickness of 155 μm and treated with silicon and dried at 110° C. for 2 minutes. Then, the release paper sheet coated with the coating solution was deposited on one side of a PVC film, thereby preparing an adhesive film formed with an adhesive layer having a uniform thickness of 20 μm. The adhesive film was wound and sufficiently aged in an oven at 60° C. for 2 days.

Example 2

An adhesive film was prepared in the same manner as in Example 1 except that WP300H, produced by Kunyang Chemical, was used as a waterborne adhesive resin (concentration of ionic components of adhesive composition: 80 ppm, analyzed by ICP).

Example 3

An adhesive film was prepared in the same manner as in Example 1 except that N657A, produced by E-Tech, was used as a waterborne adhesive resin (concentration of ionic components of adhesive composition: 510 ppm, analyzed by ICP).

Comparative Example 1

An adhesive film was prepared in the same manner as in Example 1 except that N730A, produced by E-Tech, was used as a waterborne adhesive resin (concentration of ionic components of adhesive composition: 730 ppm, analyzed by ICP).

Comparative Example 2

An adhesive film was prepared in the same manner as in Example 1 except that N732A, produced by E-Tech, was used as a waterborne adhesive resin (concentration of ionic components of adhesive composition: 760 ppm, analyzed by ICP).

Comparative Example 3

An adhesive film was prepared in the same manner as in Example 1 except that A240, produced by BASF, was used as a waterborne adhesive resin (concentration of ionic components of adhesive composition: 830 ppm, analyzed by ICP).

Comparative Example 4

An adhesive film was prepared in the same manner as in Example 1 except that NS8685, produced by National Starch, was used as a waterborne adhesive resin (concentration of ionic components of adhesive composition: 2,800 ppm, analyzed by ICP).

Physical properties of the adhesive compositions and the adhesive films prepared in Examples and Comparative Examples were evaluated as follows.

1. 180° Initial Peel Strength

Based on JIS Z 0237, the 180° initial peel strength of each adhesive film was evaluated. First, each of the adhesive films prepared in Examples and Comparative Examples was cut into a 2.5 cm×20 cm (width×length) specimen. The specimen was attached to an SUS 304 coating surface using a 2 kg roller and then left at 23° C. and 55 RH % for 24 hours (1 day). Then, peel strength was measured at a peeling speed of 1.0 m/min by using a tensile tester.

2. 180° Peel Strength after Aging

Peel strength after aging was measured in the same manner as in measuring initial peel strength except that each adhesive film was aged at 70° C. for 72 hours.

3. Aging Rate

An aging rate was calculated using initial peel strength and peel strength after aging by Equation 1;

Aging rate (%)=(b−c)/b×100, where b is initial peel strength, and c is peel strength after aging.

Evaluation results are illustrated in Table 1.

TABLE 1

|  | Example | | | Comparative Example | | | |
| --- | --- | --- | --- | --- | --- | --- | --- |
|  | 1 | 2 | 3 | 1 | 2 | 3 | 4 |
| Concentration of ionic component (ppm) | 70 | 80 | 510 | 730 | 760 | 830 | 2,800 |
| Initial peel strength (gf/25 mm) | 1719 | 1751 | 1749 | 2827 | 2212 | 1956 | 105 |
| Peel strength after aging (gf/25 mm) | 1610 | 1660 | 1418 | 1517 | 1384 | 1068 | 41 |
| Aging rate (%) | 6 | 5 | 19 | 46 | 47 | 45 | 61 |

As shown in Table 1, adhesives prepared according to similar compositions have remarkably different peeling properties and temporal stability of peeling properties depending on the content of ionic impurities. In detail, the adhesive films according to Examples of the present invention have appropriate peeling properties and an aging rate of 20% or less, thereby exhibiting excellent stability against temporal and environmental factors. However, when the concentration of ionic impurities is greater than 600 ppm, aging rate rapidly increases. Thus, when used in practice, the adhesive films are expected to drastically deteriorate in terms of adhesive performance over time due to environmental factors.

The invention claimed is:
1. An adhesive film used for advertisement comprising:
a base film including a soft white PVC film having printability; and
an adhesive layer formed on one or opposite sides of the base film and comprising a cured material of a water-based adhesive composition comprising a waterborne adhesive resin and having a concentration of ionic components of 100 ppm or less,
wherein the waterborne adhesive resin is prepared by emulsion polymerization, and the emulsion polymerization is conducted in the presence of 0.01 to 1 wt % of an oxidation-reduction catalyst in the total components in a reactor involved in the emulsion polymerization,
wherein the waterborne adhesive resin has a particle diameter of 100 to 500 nm, a weight average molecular weight of 50,000 to 700,000 and comprises a polymer of a monomer mixture including 90 to 99.9 parts by weight of a (meth)acrylic acid ester monomer having a C2 to C8 alkyl groups and 0.1 to 10 parts by weight of a crosslinking monomer,
wherein the crosslinking monomer comprises at least one selected from the group consisting of a hydroxyl group containing monomer, a carboxyl group containing monomer, a nitrogen containing monomer, and a glycidyl group containing monomer,
wherein the adhesive film has a reduction in peel strength of 6% or less after being aged at 70° C. for 72 hours based on the adhesive layer having an initial peel strength between 1719 and 1751 gf/25 mm,
wherein the reduction in peel strength occurs between the adhesive film and a surface to which the adhesive film is attached,
wherein the waterborne adhesive resin has a glass transition temperature of −60 to −10° C.,
wherein the water-based adhesive composition further comprises 0.1 to 5 parts by weight of a wetting agent based on 100 parts by weight of the waterborne adhesive resin,
wherein the wetting agent is represented by Formula 1:

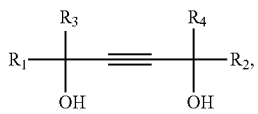

where R1 to R4 each independently represent a straight chain or branched chain alkyl group, and
wherein R1 to R4 each independently represent a C1 to C8 alkyl group.

2. The adhesive film of claim 1, wherein the adhesive layer has a thickness of 0.5 to 50 μm.

3. The adhesive film of claim 1, further comprising a release film formed on one or both of the adhesive layer(s).

4. The adhesive film of claim 1, wherein the water-based adhesive composition further comprises 0.01 to 10 parts by weight of a crosslinker based on 100 parts by weight of the waterborne adhesive resin.

5. The adhesive film of claim 4, wherein the crosslinker comprises at least one selected from the group consisting of an isocyanate compound, a metal chelate compound, an aziridine compound, and an epoxy compound.

6. The adhesive film of claim 1, wherein the water-based adhesive composition further comprises at least one selected from the group consisting of a tackifier, an initiator, low-molecular weight materials, an epoxy resin, a UV stabilizer, an antioxidant, a coloring agent, a reinforcing agent, an antifoaming agent, a plasticizer, a foaming agent, an organic salt, a thickening agent, and a flame retardant.

7. An adhesive film used for advertisement comprising:
a base film including a soft white PVC film having printability; and
an adhesive layer formed on one or opposite sides of the base film and comprising a cured material of a water-based adhesive composition comprising a waterborne adhesive resin and having a concentration of ionic components of 100 ppm or less,
wherein the waterborne adhesive resin has a particle diameter of 100 to 500 nm, a weight average molecular weight of 50,000 to 700,000 and comprises a polymer of a monomer mixture including 90 to 99.9 parts by weight of a (meth)acrylic acid ester monomer having a C2 to C8 alkyl groups and 0.1 to 10 parts by weight of a crosslinking monomer,
wherein the crosslinking monomer comprises at least one selected from the group consisting of a hydroxyl group containing monomer, a carboxyl group containing monomer, a nitrogen containing monomer, and a glycidyl group containing monomer,
wherein the adhesive film has a reduction in peel strength of 6% or less after being aged at 70° C. for 72 hours based on the adhesive layer having an initial peel strength between 1719 and 1751 gf/25 mm,
wherein the reduction in peel strength occurs between the adhesive film and a surface to which the adhesive film is attached,
wherein the waterborne adhesive resin has a glass transition temperature of −60 to −10° C.,
wherein the water-based adhesive composition further comprises 0.1 to 5 parts by weight of a wetting agent based on 100 parts by weight of the waterborne adhesive resin,
wherein the wetting agent is represented by Formula 1:

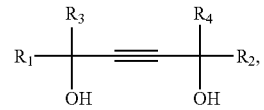

where R1 to R4 each independently represent a straight chain or branched chain alkyl group, and
wherein R1 to R4 each independently represent a C1 to C8 alkyl group.

* * * * *